(12) United States Patent
Tsai et al.

(10) Patent No.: US 8,094,930 B2
(45) Date of Patent: Jan. 10, 2012

(54) DIGITAL PHOTO FRAME CAPABLE OF CLASSIFYING IMAGES AND METHOD THEREOF

(75) Inventors: Ming-Feng Tsai, Taipei Hsien (TW); Cheng-Hao Chou, Taipei Hsien (TW); Kuan-Hong Hsieh, Taipei Hsien (TW); Xiao-Guang Li, Shenzhen (CN); Guang-Jin Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 593 days.

(21) Appl. No.: 12/272,799

(22) Filed: Nov. 18, 2008

(65) Prior Publication Data

US 2010/0040295 A1    Feb. 18, 2010

(30) Foreign Application Priority Data

Aug. 15, 2008  (CN) .......................... 2008 1 0303853

(51) Int. Cl.
    *G06K 9/00*  (2006.01)
(52) U.S. Cl. .................. 382/165; 382/162; 382/224
(58) Field of Classification Search ................. 382/224, 382/290, 165, 173, 162, 305; 438/104, 158; 257/268, 348; 326/120; 709/231, 246
    See application file for complete search history.

(56) References Cited

U.S. PATENT DOCUMENTS 8,055,082 B2 * 11/2011 Li .................................. 382/224
* cited by examiner

*Primary Examiner* — Anh Hong Do
(74) *Attorney, Agent, or Firm* — Altis Law Group, Inc.

(57) ABSTRACT

A method for classifying image is provided. The method includes: selecting an image; extracting parameters of the selected image and displaying the extracted parameter in a reminder menu; selecting a extracted parameter; defining the selected parameter as the image classifying standard; creating an image classification folder named with the image classifying standard; retrieving images according to the image classifying standard; and storing the images that were retrieved into the created folder.

12 Claims, 3 Drawing Sheets

DIGITAL PHOTO FRAME CAPABLE OF CLASSIFYING IMAGES AND METHOD THEREOF

TECHNICAL FIELD

The disclosure relates to a digital photo frame capable of classifying images and method employed by a digital photo frame to classify images.

DESCRIPTION OF RELATED ART

As we know, digital images play an important role in people's life, and a digital photo frame often store different types of images. However, users may take those images in different situations, therefore, those images may have different times, different contents, and different meanings. What is more, the images stored in a digital photo frame may be downloaded from different places, for example, from the Internet, so the images may have different formats, therefore, it is necessary for the user to classify the images that have been stored in the digital photo frame. Traditionally, a user creates different classification folders firstly, then, the user browses all images, selects images and stores the images into corresponding classification folders. Obviously, the traditional classifying manner is complicated, and it wastes the user's time and energy. Therefore, what is needed is a digital photo frame capable of classifying images easily and method thereof.

SUMMARY

A digital photo frame for classifying images is provided. The digital photo frame includes a memory, an input unit, and a processor. The memory is configured for storing images and image classification folders, wherein each of the images includes a number of parameters for describing basic information of the images. The input unit is configured for selecting an image and a parameter; and the processor being connected with the memory, includes a parameter extracting module, a determining module, a folder creating module, a searching module, and a managing module. The parameter extracting module is configured for extracting parameters of the selected image and displaying the extracted parameters in a reminder menu. The determining module is configured for defining a selected parameter as the image classifying standard. The folder creating module is configured for creating an image classification folder according to the image classifying standard, and naming the image classification folder with the image classifying standard. The searching module is configured for retrieving images according to the image classifying standard. The managing module configured for storing the images into the created image classification folders.

Other advantages and novel features will be drawn from the following detailed description of the preferred embodiment with reference to the attached drawings.

BRIEF DESCRIPTION OF THE DRAWINGS

The components of the drawings are not necessarily drawn to scale, the emphasis instead being placed upon clearly illustrating the principles of a digital photo frame. Moreover, in the drawings, like reference numerals designate corresponding parts throughout several views.

DETAILED DESCRIPTION OF EMBODIMENTS

Figure 1:
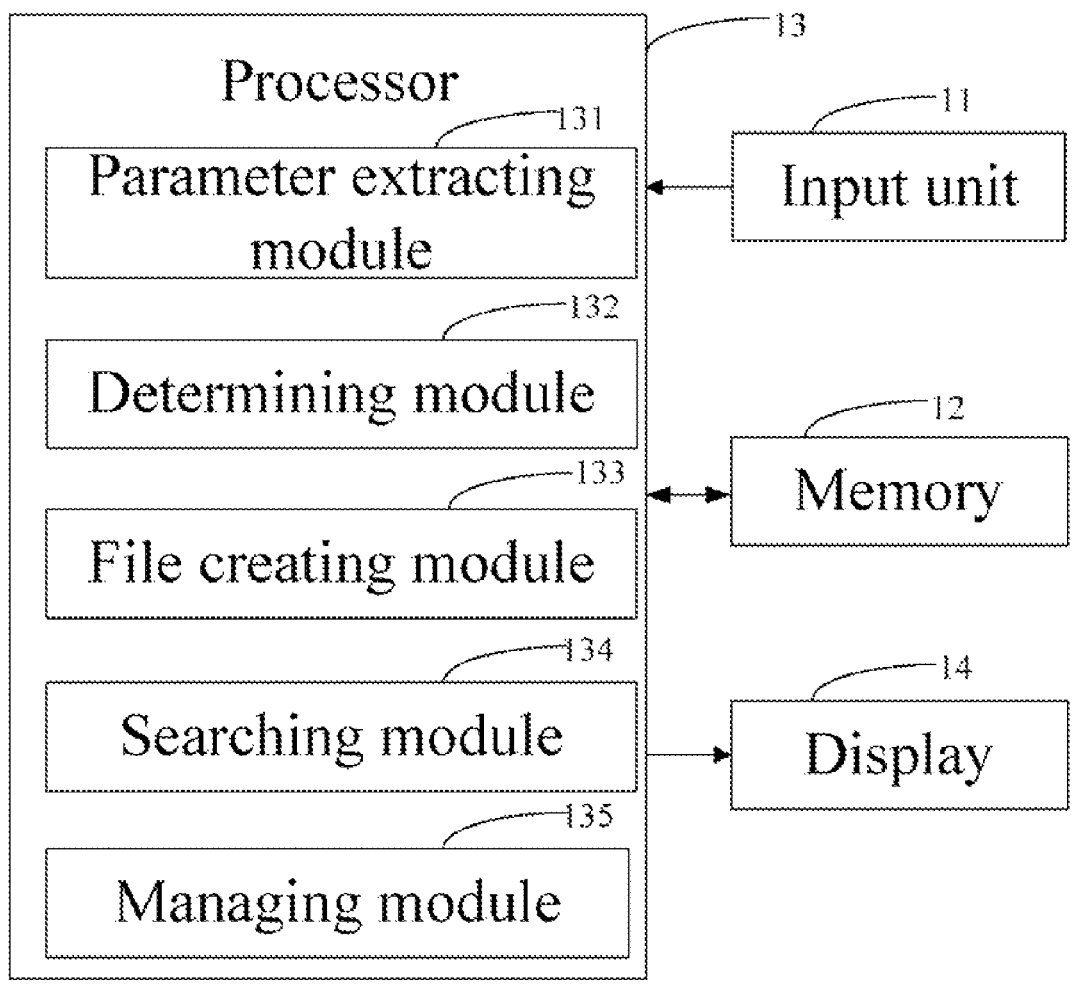
FIG. 1 is a functional block diagram of a digital photo frame in accordance with an exemplary embodiment.

FIG. 1 is a functional block diagram of a digital photo frame in accordance with an exemplary embodiment. The digital photo frame includes at least one input unit 11, a memory 12, a processor 13, and a display 14.

The memory 12 is configured for storing images and image classification folders. Each of the images includes a number of parameters for describing basic information of the image. The parameters include, but are not limited to, ratio, brightness, contrast, color, and angle view of an image. The processor 13 connected with the memory 12, includes a parameter extracting module 131, a determining module 132, a folder creating module 133, a searching module 134, and a managing module 135. The parameter extracting module 131 is configured for extracting parameters of the selected image and displaying the extracted parameters in a reminder menu. The determining module 132 is configured for defining a parameter that selected by the user via the input unit 11 as the image classifying standard. The folder creating module 133 is configured for creating an image classification folder according to the image classifying standard, and naming the image classification folder with the image classifying standard. The searching module 134 is configured for retrieving images stored in the memory 12 according to the image classifying standard. The managing module 135 is configured for storing the images that are retrieved by the searching module 134 into the image classification folder. In an exemplary embodiment, the managing module 135 moves the images retrieved by the searching module 134 into the image classification folder; in another exemplary embodiment, the managing module 135 stores a shortcut of the images retrieved by the searching module 134 into the image classification folder. Furthermore, the modules of the processor 13 can also further classify images stored in the image classification folder according to above-mentioned manner, and create image classifying sub-folders.

Furthermore, when the determining module 132 defines the image classifying standard, the searching module 134 determines whether there is an image classification folder named with the image classifying standard. If there is no such folder, the folder creating module 133 creates an image classification folder named with the image classifying standard, and if there exists an image classification folder named with the defined image classifying standard, the managing 135 stores the images retrieved by the searching module 134 into the image classification folder directly.

The digital photo frame further provides a special key, and the user presses the special key to get into a procedure of classifying images; the digital photo frame can also provides a menu, and the user activates the menu to get into a procedure of classifying images.

Figure 2:
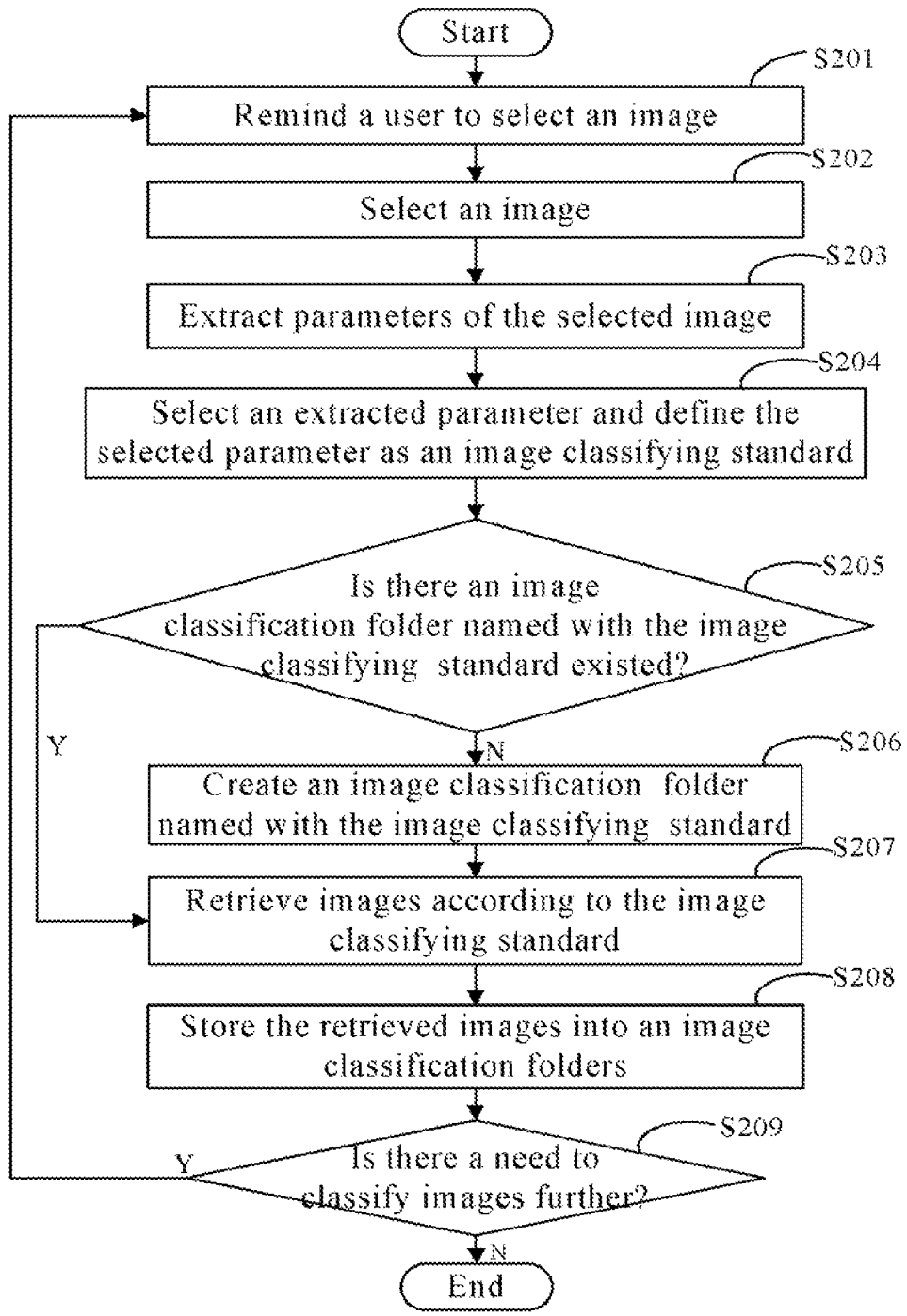
FIG. 2 is a flowchart for a method of classifying images in accordance with an exemplary embodiment.

FIG. 2 is a flowchart for a method of classifying images applied in the digital photo frame of FIG. 1 in accordance with an exemplary embodiment.

In step S201, after the user gets into the procedure of classifying images though the manner described above (e.g., the special key or the menu), the processor 13 reminders the user to select an image.

In step S202, the user selects an image via the input unit 11.

Figure 3:
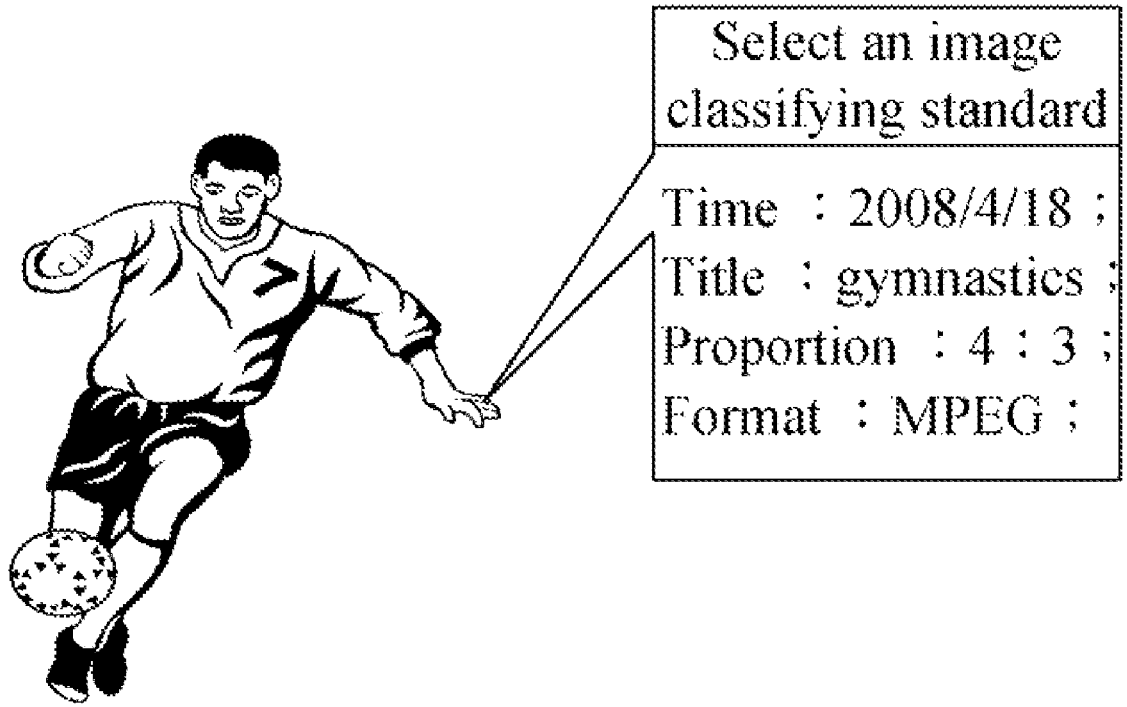
FIG. 3 an exemplary schematic diagram illustrating a prompt to remind a user of selecting a extracted parameter as the image classifying standard in accordance with an exemplary embodiment.

In step S203, the parameter extracting module 131 extracts parameters of the selected image and displays a prompt to remind the user to select a parameter (see FIG. 3).

In step S204, the parameter extracting module 131 defines the selected parameter as the image classifying standard.

In step S205, the searching module 134 determines whether there is an image classification folder named with the image classifying standard. If there exists the image classification folder, the procedure goes to S207 described below. If there is no such folder, the procedure goes to S206 described below.

In step S206, the folder creating module 133 creates an image classification folder according to the image classifying standard, and names the created image classification folder with the image classifying standard.

In step S207, the searching module 134 retrieves images stored in the memory 12 according to the image classifying standard.

In step S208, the managing module 135 stores the retrieved images into the image classification folder. In an exemplary embodiment, the managing module 135 moves the images that are retrieved by the searching module 134 into the image classification folder. In another exemplary embodiment, the managing module 135 stores the image file paths of the retrieved images into the image classification folder.

In step S209, the parameter extracting module 131 displays another prompt to remind the user whether to classify images of the created image classification folder further, that is, whether to create a subcategory of the created image classification folder. If not, the procedure is over; and if there is a need to continue to classify images of the created image classification folder, the procedure goes to S201 described above.

Although the present invention has been specifically described on the basis of the exemplary embodiment thereof, the invention is not to be construed as being limited thereto. Various changes or modifications may be made to the embodiment without departing from the scope and spirit of the invention.

What is claimed is:

1. A digital photo frame (DPF) for classifying images, the DPF comprising:
 a memory for storing images and image classification folders, wherein each of the images comprises a number of parameters for describing basic information of the image;
 an input unit capable of being used to select an image and a parameter of the image; and
 a processor being connected with the memory and the input unit, comprising:
 a parameter extracting module configured for extracting parameters of the selected image and displaying the extracted parameters in a reminder menu;
 a determining module configured for defining a selected parameter as the image classifying standard;
 a folder creating module configured for creating an image classification folder according to the image classifying standard, and naming the image classification folder with the image classifying standard;
 a searching module configured for retrieving images according to the image classifying standard; and
 a managing module configured for storing the retrieved images into the created image classification folder.

2. The DPF as described in claim 1, wherein the parameters of an image includes at least one of ratio, brightness, contrast, color, or angle view of a picture.

3. The DPF as described in claim 1, wherein the managing module is configured for moving the images retrieved by the searching module to the created image classification folder.

4. The DPF as described in claim 1, wherein the managing module is configured for storing a shortcut of the retrieved images to the created image classification folder.

5. The DPF as described in claim 1, wherein the created image classification folders includes many image classifying sub-folders created by the folder creating module, each of the image classifying sub-folders corresponds to an image classifying standard.

6. The DPF as described in claim 1, wherein the searching module is further configured for determining whether there is an image classification folder named with the image classifying standard when the determining module determines the image classifying standard.

7. The DPF as described in claim 6, wherein if there exists an image classification folder named with the defined image classifying standard, the managing module is further configured for storing the images retrieved by the searching module into the image classification folder directly.

8. A method of classifying images applied on a digital photo frame (DPF), the DPF comprising a processor, the method comprising:
 extracting parameters of a selected image and displaying the extracted parameters in a reminder menu via the processor;
 defining a selected parameter value as the image classifying standard via the processor;
 creating an image classification folder according to the image classifying standard via the processor;
 retrieving images according to the image classifying standard via the processor; and
 storing the images retrieved into the image classification folder via the processor.

9. The method as described in claim 8, further comprising: storing a shortcut of the images that were retrieved into the created image classification folder via the processor.

10. The method as described in claim 8, wherein creating an image classification folder according to the image classifying standard via the processor further comprises naming the image classification folder with the image classifying standard via the processor.

11. The method as described in claim 8, further comprising determining whether there exists an image classification folder that named with the image classifying standard via the processor when the image classifying standard is defined.

12. The method as described in claim 11, further comprising storing the retrieved images into the existed image classification folder via the processor if there exists the image classification folder.

* * * * *